Nov. 11, 1952       R. K. GRIFFITH ET AL       2,617,779
     PLASTICIZED VINYL HALIDE RESINS AND ELECTRICAL
              CONDUCTORS INSULATED THEREWITH
                    Filed May 28, 1949
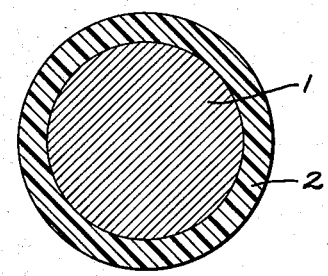
Inventors:
Roland K. Griffith,
Henry C. Nelson, Jr.,
by
     Their Attorney.

Patented Nov. 11, 1952

2,617,779

UNITED STATES PATENT OFFICE 2,617,779

PLASTICIZED VINYL HALIDE RESINS AND ELECTRICAL CONDUCTORS INSULATED THEREWITH

Roland K. Griffith, Schenectady, and Henry C. Nelson, Jr., Averill Park, N. Y., assignors to General Electric Company, a corporation of New York Application May 28, 1949, Serial No. 96,132

8 Claims. (Cl. 260—31.6)

This invention relates to plasticized vinyl resins. More particularly, the present invention is concerned with vinyl halide resins plasticized with a composition of matter comprising the liquid product of reaction of a mixture of ingredients comprising (1) a saturated, aliphatic dihydric alcohol containing at least three carbon atoms, (2) a saturated, aliphatic dicarboxylic acid, and (3) a saturated, aliphatic monohydric alcohol, the said monohydric alcohol acting as an esterifying chain stopper at each end of the linear ester chain formed by the reaction between the aforesaid dihydric alcohol and dicarboxylic acid. The various plasticizers and methods for preparing the same employed in the practice of the instant invention are more particularly disclosed and claimed in our copending application Serial No. 96,131, now abandoned, filed concurrently herewith and assigned to the same assignee as the present invention, which application, for purposes of brevity, by reference is made part of the instant application as to all its disclosures.

Many plasticizers have been employed for plasticizing vinyl halide resins. In almost every case it has been necessary to use a specific plasticizer if it is desired to obtain a particular property in the plasticized material. Thus whereas one plasticizer might improve the low temperature flexibility of the vinyl halide resin, such plasticizer might well be too volatile at elevated temperatures when incorporated in the vinyl halide resin. Moreover, whereas some plasticizers might have good light and weather resistance, the same plasticizer might be deficient in either its oil resistance or its compatibility with the vinyl halide resin.

We have now discovered that a certain class of chain-stopped linear, permanently fusible liquid polyesters, more particularly described above, have eminent suitability as plasticizers for vinyl halide resins and these linear chain-stopped polyesters incorporate many of the more desirable properties found individually in other plasticizers. Unexpectedly, we have discovered that this particular class of plasticizers when incorporated in a vinyl halide resin by suitable means imparts to such resin outstanding flexibility, good low temperature flexibility, light-resistance and weather-resistance, as well as outstanding oil resistance, and, in addition, the plasticized vinyl halide resin exhibits an extraordinarily low volatility at elevated temperatures and possesses a limited molecular mobility of the plasticizer within the polymeric structure of the vinyl halide resin. The use of such plasticizers is unexpectedly enhanced by the fact that these plasticizers are liquid and of sufficiently low viscosity to permit easy handling, can be manufactured easily and economically, and impart to the vinyl halide resin an attractive feel or "hand."

The chain-stopped polyester employed in the practice of the present invention may be prepared by effecting reaction between a mixture of ingredients comprising (1) a saturated aliphatic dihydric alcohol containing at least three carbon atoms, (2) a saturated aliphatic dicarboxylic acid, preferably containing at least four carbon atoms, and (3) a saturated aliphatic monohydric alcohol, for instance, ethanol, propanol, butanol, isobutanol, hexanol, 2-ethylhexanol, isooctanol (including various other isomers and mixtures of isomers of octyl alcohol), nonyl alcohol (e. g., trimethylhexanol, etc.), dodecanol, etc., as well as the many isomers of such alcohols. Preferably, the saturated aliphatic monohydric alcohol contains from 6 to 12 carbon atoms for optimum compatibility with vinyl halide resins and lower volatility.

In preparing the claimed compositions of matter any one of the many known saturated aliphatic dihydric alcohols containing at least three carbon atoms may be employed for the purpose. These include, for instance, propylene glycol, dipropylene glycol, di-, tri- and tetraethylene glycols, trimethylene glycol, hexaethylene glycol, decamethylene glycol, propanediol-1,3, 2,2-dimethylpropanediol-1,3, butanediol-1,4, etc. For many plasticizing uses it is preferred that the dihydric alcohol employed be propylene glycol

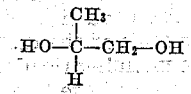

Examples of saturated aliphatic dicarboxylic acids which may be employed are those corresponding to the general formula

where $n$ equals from 1 to 10, preferably from 2 to 8, for instance, malonic, succinic, adipic, glutaric, pimelic, sebacic, azelaic, suberic, etc. acids. Branched chain isomers of such acids may also be employed. We prefer to use dicarboxylic acids containing from 4 to 10 total carbon atoms including the carboxy groups.

It is possible to design the individual plasticizer molecule so as to arrive at compositions which are chain-stopped and which conform to certain predetermined molecular chain lengths. Such compositions of matter may be considered as corresponding to the general formula

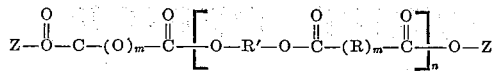

where Z is a saturated aliphatic residue of the monohydric alcohol, R is a methylene (CH2) radical, R' is the organic residue (e. g., alkylene residue) of the saturated aliphatic dihydric alcohol, $m$ is an integer equal to from 1 to 10 and $n$ is an integer equal to from 1 to 10, preferably from 3 to 7. The simplest composition obtainable may be represented by the formula

HO—R'—OH + 2HOOC—R—COOH + 2ZOH

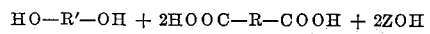
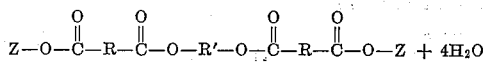

where R, R', and Z have the meanings given above.

From the foregoing formula it will be apparent that the length of the linear chain-stopped, liquid, permanently fusible polyester employed as a plasticizer can be increased or decreased so as to influence the properties of the final composition. By being able to tailor the molecule and by controlling the proportion and type of ingredients, it is also possible to control the viscosity of the final plasticizer composition.

In preparing the plasticizers, the reactants are preferably charged to a reaction vessel equipped with stirring and heating means. Small amounts of the usual acidic catalysts ordinarily employed in esterification processes as, for instance, hydrochloric acid and sulfuric acid, may also be added to the reaction mixture to expedite the formation of the claimed compositions of matter, although we have found in many instances this is not essential. Thereafter, the mixture is heated at elevated temperatures, for example, from about 125° to 250° C. for a period of from 2 to 15 hours or more while at the same time removing the water of esterification formed during the process. The heating is preferably conducted in a manner calculated to cause an incremental increase in the temperatures of the reaction mass during the period of the reaction with a concurrent decrease in the acid number. If desired, the reaction may be conducted in the presence of selected solvents which are inert to the reactants or the reaction product.

Generally, the proportions of ingredients may be varied within wide limits depending upon the size of the molecule desired. Thus, on a molar basis, we may use for each mol of the dihydric alcohol at least two mols of the dicarboxylic acid and two mols of the monohydric alcohol sufficient to effect chain stopping of the linear polyester.

In preparing the plasticizers, if suitable molar equivalents of the ingredients are present in the reaction mixture, continued heating at elevated temperatures will cause the acid value of the final reaction product to be lower. In many applications, especially in general plasticizing applications, higher acid values can be tolerated satisfactorily. However, where it is important to maintain optimum electrical properties, it has been found eminently desirable and in many cases necessary to bring the acid value of the final reaction product to below 5 as pointed out previously, e. g., from 0.2 to 4.

As pointed out previously, the plasticizer can be tailored to any desired molecular weight or linearity depending on the molar proportions and the ingredients used in the reaction mixture. For most applications, on a molar ratio basis, we have found it preferable to use from 4 to 8 mols of the dicarboxylic acid in the reaction mixture. The amount of the dihydric alcohol employed in such instances is generally equal to $n-1+x$ mols where $n$ is equal to the number of mols of the dicarboxylic acid and $x$ is equal to at least a slight molar excess or even a large molar excess, for example, from 0.1 to 2 or more molar excess of the dihydric alcohol necessary to cause the reaction to go to completion.

The chain-stopping monohydric alcohol is preferably present in a proportion of at least 2 mols, excess amounts remaining unreacted and requiring later removal in isolation and purification of the chain-stopped reaction product. However, an excess of the monohydric alcohol does assist in causing the reaction to go to completion by acting as an entraining agent for the water of esterification. However, extreme care should be exercised to remove all traces of the excess monohydric, saturated aliphatic alcohol.

Generally, it is desired for most plasticizing applications where good compatibility, working and handling characteristics, and low volatility are essential properties, to maintain the viscosity within the range of about 250–4000 centipoises at 25° C., e. g., from 350 to 2500 centipoises. In all cases the actual viscosity will depend upon the molar ratio of the dicarboxylic acid to the dihydric alcohol, the ingredients used, the degree of condensation between these two reactants as evidenced by the lowering of the acid value, etc.

The vinyl halide resins for which the chain-stopped linear polyesters disclosed and claimed in our aforementioned application, Serial No. 96,131, are eminently suitable as plasticizers, comprise the product of polymerization of a mass containing a vinyl halide, for instance, a predominant proportion of the vinyl halide. Among such compositions are (1) the polyvinyl halides, such as, for example, polyvinyl chloride (including the different molecular weight forms, e. g., gamma-polyvinyl chloride, etc.), polyvinyl bromide, etc.; (2) vinyl resins produced by the conjoint polymerization of a vinyl halide, e. g., vinyl chloride, and a vinyl ester of a lower saturated aliphatic monocarboxylic acid, for instance, vinyl acetate (such vinyl chloride-vinyl acetate copolymers being available under the trade name of "Vinylite" resins wherein the vinyl chloride component is present in a preponderant amount), vinyl propionate, vinyl butyrate, vinyl hexoate, vinyl aceto-butyrate, vinyl chloroacetate, vinyl chloropropionate, etc., it being understood from the foregoing examples that the term "lower saturated aliphatic monocarboxylic acid" embraces ones containing at most six carbon atoms; (3) vinyl resins produced by the conjoint polymerization of a vinyl halide and an acrylic compound, e. g., the copolymers of vinyl chloride with, for example, ethyl methacrylate, methyl methacrylate, benzyl or chlorobenzyl acrylate, methyl chloroacrylate, etc.; (4) copolymers of a vinyl halide, e. g., vinyl chloride, and a vinylidene halide, e. g., vinylidene chloride; and (5) many other vinyl resin copolymers, such as the copolymers of three-component systems, for example, vinyl chloride, vinyl acetate and ethyl methacrylate, etc. As will be understood by those skilled in the art, other multi-component copolymers may be used, the only requirement being that at least one of the components is a vinyl halide. Further methods of preparation of the vinyl halide resins employed herein and additional examples of vinyl halide copolymers which may be plasticized with the aforementioned chain-stopped linear polyesters may be found in, e. g., D'Alelio Patents 2,378,753, issued June 19, 1945, and 2,299,740, issued October 27, 1942, both of which are assigned to the same assignee as the present invention.

As pointed out previously, the chain-stopped linear, permanently fusible liquid polyesters formed as a result of reacting a mixture of ingredients comprising (1) a saturated aliphatic dihydric alcohol containing at least three carbon atoms, (2) a saturated aliphatic dicarboxylic acid and (3) a saturated aliphatic monohydric alcohol are more particularly disclosed and claimed in our aforementioned application, which by reference is made a part of this application. For many applications we prefer to use as plasticizers for the aforementioned vinyl halide resins compositions resulting from the reaction of a mixture of ingredients comprising (1) a saturated aliphatic dihydric alcohol containing from three to eight carbon atoms, (2) a saturated aliphatic dicarboxylic acid containing from four to ten carbon atoms, and (3) a monohydric saturated aliphatic alcohol containing from six to twelve carbon atoms. The longer chain branched and normal monohydric alcohols tend to improve the compatibility of the plasticizer with the vinyl halide resin. By a proper choice of reactants in making the plasticizer, it is possible to tailor a particular plasticizer for a certain application, taking into account the ultimate use to which the plasticized vinyl halide resin is intended to be put.

In order that those skilled in the art may better understand how the present invention may be practiced, the following example is given by way of illustration and not by way of limitation. All parts are by weight.

EXAMPLE 1

In this example a chain-stopped, permanently fusible liquid polyester was prepared by charging the following reactants to a reaction kettle equipped with a stirrer and heating means.

|  | Parts | Molar Ratio |
|---|---|---|
| Adipic acid | 1023.0 | 7. |
| Propylene glycol | 502.2 | 6.6 |
| Iso-octyl alcohol [1] | 273.4 | 2.1 |

[1] Mixture of branched chain isomers of octyl alcohol.

The above mixture was heated under a nitrogen atmosphere to a temperature of from 150° to 155° C. for about 2 hours until an acid value of 200 was obtained, then to 180–185° C. for 2 additional hours until an acid value of 100 was obtained, thereafter 3 more hours at 230–235° C. until an acid value of 25 was obtained, and thereafter raised to 250° C. for 4 hours until an acid value of 1.34 was obtained. During the reaction the water of esterification was removed from the reacting mass. Any remaining unreacted ingredients were removed from the reaction mass by passing a stream of nitrogen through the mass to leave a liquid, permanently fusible, chain-stopped product having a viscosity of 1450 centipoises.

The above liquid plasticizer was mixed with the following ingredients in the stated proportions:

| Ingredients: | Parts |
|---|---|
| Copolymer of 85% vinyl chloride and 15% vinyl acetate | 60 |
| Chain-stopped linear polyester plasticizer | 40 |
| 3PbO·BbSO$_4$·H$_2$O (stabilizer) | 5 |

The above ingredients were milled together for about 10 minutes on heated differential rolls until a homogeneous mixture of this material was obtained. Another milled sample was prepared exactly as above using the same formulation with the exception that gamma polyvinyl chloride was substituted in place of the copolymer recited above. Each of the plasticized materials was pressed into the form of solid sheets which were then subjected to various tests with the following results:

Table I

| Plasticized Composition | Tensile, p. s. i. | Percent Elongation | Cold Temperature Flexibility |
|---|---|---|---|
| Copolymer of vinyl chloride and vinyl acetate | 2,830 | 385 | −30° C. |
| Polyvinyl chloride | 2,680 | 345 | −15° C. |

Table II

| Plasticized Composition | Heat Aging 7 Days at 100° C. | | | Percent Change in Elongation |
|---|---|---|---|---|
|  | Tensile, p. s. i. | Percent Change in Tensile | Elongation |  |
| Copolymer of vinyl chloride and vinyl acetate | 2,980 | +5.3 | 380 | −1.3 |
| Polyvinyl chloride | 2,820 | +5.2 | 340 | −1.4 |

Table III

IMMERSION IN SAE NO. 20 OIL 4 HOURS AT 70° C.

| Plasticized Composition | Tensile, p. s. i. | Percent Elongation |
|---|---|---|
| Copolymer of vinyl chloride and vinyl acetate | 2,620 | 335 |
| Polyvinyl chloride | 2,560 | 330 |

Exposure of each of the aforementioned plasticized compositions to ultraviolet light and in a weatherometer for 120 hours and 350 hours, respectively, showed no effect with regard to the ultraviolet light on the plasticized composition and only a slight change in color as a result of the weatherometer exposure.

It will, of course, be apparent to those skilled in the art that other vinyl halide resins as well as other chain-stopped, liquid linear polyesters, many examples of which have been giiven in our aforementioned patent application, may be employed in place of the vinyl halide resins and liquid chain-stopped polyesters used above without departing from the scope of the invention. Thus, we may use other polymers of vinyl halides and copolymers of other vinyl halide comonomers such as, for instance, a copolymer of vinyl chloride and vinyl propionate, etc. Additional examples of chain-stopped, linear, liquid polyesters which may be employed are, for instance, the products of reaction of adipic acid, dipropylene glycol and iso-octyl alcohol; the product of reaction of adipic acid, propylene glycol and n-octanol; the product of reaction of adipic acid, octylene glycol and n-octyl alcohol; the product of reaction of adipic acid, propylene glycol and n-decylene alcohol; the product of reaction of adipic acid, propylene glycol and 2-ethylhexanol; etc.

It will also be apparent to those skilled in the art that other methods of compounding and incorporating the plasticizer may be used as, for instance, spraying the plasticizer into finely divided particles of the vinyl halide resin, etc. The amount of plasticizer used in each case may be varied at will and within wide limits and we do not intend to be limited to any particular range since the properties of the plasticized vinyl halide resin are dependent to a large extent on the amount of plasticizer incorporated. In many applications we have found it advantageous to use from 10 to 70 per cent of the plasticizer based on the total weight of the vinyl halide resin and the plasticizer. Preferably, we may use from 25 to 60 per cent of the plasticizer based on the total weight of the latter and the vinyl halide resin.

In addition, other heat stabilizers than the lead oxide used in the foregoing example may also be employed as, for instance, lead silicate, tribasic lead sulfate ($3PO.PbSO_4.H_2O$), lead carbonate, lead trimethylsilanolate, etc. The stabilizer is preferably present in an amount equal to from about 0.5 to 10 or 15 per cent, by weight, based on the weight of the vinyl halide resin. Although amounts in excess of 15 per cent may be employed, for economical reasons smaller amounts are preferred. The aforementioned tribasic lead sulfate has unexpectedly imparted greatly improved properties to the plasticized vinyl halide resin as compared to when the stabilizer comprised, for example, litharge.

In the compounding of the plastic compositions for various uses, there may be included materials such as fillers, e. g., lithopone, titanium dioxide, etc. as well as other common plasticizers such as, for example, dioctyl phthalate, tricresyl phosphate, etc., pigments and other modifying materials, without detrimental effect upon the heat, light and electrical stability of the plasticizing materials. For optimum electrical properties, it is highly desirable that the acid value of the chain-stopped linear polyester be below 5, for instance, from 0.1 to 2.

The foregoing chain-stopped linear polyesters may be used to plasticize other halogen-containing resinous and rubber-like products, for instance, polyvinylidene products and copolymers thereof (e. g., polyvinylidene chloride and copolymers thereof, neoprene, chlorinated paraffin wax, chlorinated rubber, etc.). These same plasticizers may be used also to plasticize many cellulose esters and ethers, acrylic acid ester polymers, urea and melamine resins, polyvinyl formal and polyvinyl butyral resins, alkyd resins, etc. The claimed plasticized compositions may be mixed with many other synthetic resins and rubbers in varying proportions to modify the properties of the latter in many instances.

The claimed plasticized compositions can be used for making shower curtains, table cloths, rain coats, etc. They are eminently suitable for insulating electrical conductors as, for instance, copper conductors, etc. Copper cores insulated with the claimed plasticized compositions, for instance, with the plasticizer found in Example 1, are extremely heat-stable and exhibit good electrical characteristics, especially when the acid value of the plasticizer is below 2. The accompanying drawing shows an insulated conductor comprising a metallic core 1 and an outer insulation 2 comprising a vinyl halide resin plasticized with the liquid compositions disclosed and claimed in our aforementioned copending application.

What I claim as new and desire to secure by Letters Patent of the United States is:

1. A composition of matter comprising (1) a vinyl halide resin selected from the class consisting of polyvinyl chloride and copolymers of vinyl chloride and vinyl acetate in which the vinyl acetate comprises a minor proportion of the total weight of the vinyl chloride and vinyl acetate; and (2) a plasticizer for (1) comprising an alcohol chain-stopped, liquid, heat-stable, permanently fusible composition comprising the product of reaction under heat of a mixture of ingredients in the following molar ratio and consisting essentially of (a) from 4 to 8 mols of a dicarboxylic acid selected from the class consisting of adipic and azelaic acids, (b) $n-1+x$ moles of a dihydric alcohol selected from the class consisting of propylene glycol and dipropylene glycol, where $n$ is equal to the number of mols of the dicarboxylic acid and $x$ is equal to a slight molar excess of the dihydric alcohol necessary to effect complete esterification, and (c) about 2 mols of a monohydric linear saturated aliphatic alcohol containing from 6 to 12 carbon atoms, said monohydric alcohol acting as an esterifying chain-stopper at each end of the linear ester chain formed by the reaction of the aforementioned dihydric alcohol and dicarboxylic acid.

2. A composition of matter comprising, by weight, (1) from 40 to 75% polyvinyl chloride and (2) from 25 to 60% of a plasticizer for (1) comprising an alcohol chain-stopped, liquid, heat-stable, permanently fusible composition having an acid value below 5 and comprising the product of reaction under heat of a mixture of ingredients in the following molar ratio and consisting essentially of (a) from 4 to 8 mols of adipic acid, (b) $n-1+x$ mols propylene glycol where $n$ is equal to the number of mols of adipic acid and $x$ is equal to a slight molar excess of the propylene glycol necessary to effect complete esterification, and (c) iso-octyl alcohol, the said iso-octyl alcohol acting as an esterifying chain-stopper at each end of the linear ester chain formed by the reaction between the aforesaid propylene glycol and adipic acid.

3. A composition of matter comprising, by weight, (1) from 40 to 75% of a vinyl halide resin comprising the conjoint polymerization of a mass containing a predominant proportion of vinyl chloride and a minor proportion of vinyl acetate and (2) from 25 to 60% of a plasticizer for (1) comprising an alcohol chain-stopped, liquid, heat-stable, permanently fusible composition having an acid value below 5 and comprising the product of reaction under heat of a mixture of ingredients in the following molar ratio and consisting essentially of (a) from 4 to 8 mols adipic acid, (b) $n-1+x$ mols propylene glycol where $n$ is equal to the number of mols of adipic acid and $x$ is equal to a slight molar excess of the propylene glycol necessary to effect complete esterification, and (c) iso-octyl alcohol, the said iso-octyl alcohol acting as an esterifying chain-stopper at each end of the linear ester chain formed by the reaction between the aforesaid propylene glycol and adipic acid.

4. A composition of matter comprising (1) a vinyl halide resin selected from the class consisting of polyvinyl chloride and copolymers of vinyl chloride and a vinyl ester of a lower saturated aliphatic monocarboxylic acid in which the vinyl chloride comprises a preponderant proportion of the latter and the vinyl ester, (2) a plasticizer for (1) comprising an alcohol chain-stopped, liquid, heat-stable, permanently fusible composition comprising the product of reaction under heat of a mixture of ingredients in the following molar ratio and consisting essentially of (a) from 4 to 8 mols of a saturated aliphatic dicarboxylic acid containing from 4 to 10 total carbon atoms including the carbons in the carboxy groups, (a) $n-1+x$ mols of a saturated aliphatic dihydric alcohol containing at least three carbon atoms, where $n$ is equal to the number of mols of the dicarboxylic acid and $x$ is equal to a slight molar excess of the dihydric alcohol necessary to effect complete esterification, and (c) about 2 mols of a monohydric saturated aliphatic alcohol containing from 6 to 12 carbon atoms, the said monohydric alcohol acting as an esterifying chain-stopper at each end of the linear ester chain formed by the reaction of the aforementioned dihydric alcohol and dicarboxylic acid, and (3) a stabilizer for (1) comprising a tribasic lead salt corresponding to the formula $$3PbO.PbSO_4.H_2O$$

5. A composition of matter comprising (1) polyvinyl chloride, (2) a plasticizer for (1) comprising an alcohol chain-stopped, liquid, heat-stable, permanently fusible composition comprising the product of reaction under heat of a mixture of ingredients in the following molar ratio and consisting essentially of (a) from 4 to 8 mols adipic acid, (b) $n-1+x$ mols propylene glycol where $n$ is equal to the number of mols of adipic acid and $x$ is equal to a slight molar excess of the propylene glycol necessary to effect complete esterification, and (c) an octyl alcohol, the octyl alcohol acting as an esterifying chain-stopper at each end of the linear ester chain formed by the reaction of the aforesaid propylene glycol and adipic acid, and (3) a stabilizer for (1) comprising a tribasic lead salt corresponding to the formula $3PbO.PbSO_4.H_2O$.

6. A composition of matter comprising (1) a vinyl halide resin comprising the resinous product of conjoint polymerization of a mass consisting essentially of a major proportion of vinyl chloride and a minor proportion of vinyl acetate, (2) a plasticizer for (1) comprising an alcohol chain-stopped, liquid, heat-stable, permanently fusible composition comprising the product of reaction under heat of a mixture of ingredients in the following molar ratio and consisting essentially of (a) from 4 to 8 mols adipic acid, (b) $n-1+x$ mols propylene glycol where $n$ is equal to the number of mols of adipic acid and $x$ is equal to a slight molar excess of the propylene glycol necessary to effect complete esterification, and (c) an octyl alcohol, the octyl alcohol acting as an esterifying chain-stopper at each end of the linear ester chain formed by the reaction of the aforesaid propylene glycol and adipic acid, and (3) a stabilizer for (1) comprising a tribasic lead salt corresponding to the formula $3PbO.PbSO_4.H_2O$.

7. An insulated electrical conductor comprising (1) an electrically conducting metallic core and (2) insulation for said core comprising a vinyl halide resin selected from the class consisting of polyvinyl chloride and a copolymer of vinyl chloride and vinyl acetate in which the vinyl acetate comprises a minor proportion of the mixture of the total weight of the latter and the vinyl chloride, the said vinyl halide resin containing as a plasticizer therefor an alcohol chain-stopped, liquid, heat-stable, permanently fusible composition comprising the product of reaction under heat of a mixture of ingredients in the following molar ratio and consisting essentially of (a) from 4 to 8 mols of a dicarboxylic acid selected from the class consisting of adipic and azelaic acids, (b) $n-1+x$ mols of a dihydric alcohol selected from the class consisting of propylene glycol and dipropylene glycol, where $n$ is equal to the number of mols of the dicarboxylic acid and $x$ is equal to a slight molar excess of the dihydric alcohol necessary to effect complete esterification, and (c) about 2 mols of a linear saturated aliphatic monohydric alcohol containing from 6 to 12 carbon atoms, the said monohydric alcohol acting as an esterifying chain-stopper at each end of the linear ester chain formed by the reaction between the aforesaid dihydric alcohol and dicarboxylic acid.

8. A composition of matter comprising (1) a copolymer of vinyl chloride and vinyl acetate in which the latter ingredient comprises a minor proportion of the total weight of the vinyl chloride and the vinyl acetate, and (2) a plasticizer for (1) comprising an alcohol chain-stopped, liquid, heat-stable, permanently fusible composition having an acid number below 5 and a viscosity within the range of from about 250 to 4000 centipoises at 25° C. and comprising the product of reaction under heat of a mixture of ingredients in the following molar ratio and consisting essentially of (a) from 4 to 8 mols adipic acid, (b) $n-1+x$ mols propylene glycol, where $n$ is equal to the number of mols of adipic acid and $x$ is equal to a slight molar excess of the propylene glycol necessary to effect complete esterification, and (c) about 2 mols iso-octyl alcohol, said iso-octyl alcohol acting as an esterifying chain stopper at each end of the linear ester chain formed by the reaction between the aforesaid propylene glycol and adipic acid.

ROLAND K. GRIFFITH.
HENRY C. NELSON, Jr.

REFERENCES CITED

The following references are of record in the file of this patent:

UNITED STATES PATENTS

| Number | Name | Date |
| --- | --- | --- |
| 2,020,247 | Irey | Nov. 5, 1935 |
| 2,035,314 | Hansley et al. | Mar. 24, 1936 |
| 2,035,528 | Brubaker | Mar. 31, 1936 |
| 2,036,009 | Wright | Mar. 31, 1936 |
| 2,075,107 | Frazier | Mar. 30, 1937 |
| 2,141,126 | Doolittle | Dec. 20, 1938 |
| 2,191,056 | Wick | Feb. 20, 1940 |
| 2,407,479 | D'Alelio | Sept. 10, 1946 |

FOREIGN PATENTS

| Number | Country | Date |
| --- | --- | --- |
| 718,171 | Germany | Mar. 4, 1942 |
| 586,826 | Great Britain | Apr. 1, 1947 |
| 610,138 | Great Britain | Oct. 12, 1948 |